US012196013B2

(12) United States Patent
Doan et al.

(10) Patent No.: US 12,196,013 B2
(45) Date of Patent: Jan. 14, 2025

(54) DOOR SYSTEM

(71) Applicant: Apple Inc., Cupertino, CA (US)

(72) Inventors: Thuan D. Doan, Palo Alto, CA (US); Ali Tavakoli Targhi, San Jose, CA (US); Steven H. Klotz, Austin, TX (US); Donald R. Monroe, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 179 days.

(21) Appl. No.: 17/842,099

(22) Filed: Jun. 16, 2022

(65) Prior Publication Data

US 2023/0009718 A1 Jan. 12, 2023

Related U.S. Application Data

(60) Provisional application No. 63/220,467, filed on Jul. 10, 2021.

(51) Int. Cl.

*E05B 81/22* (2014.01)
*E05B 81/06* (2014.01)
*E05B 81/34* (2014.01)
*E05B 81/44* (2014.01)

(52) U.S. Cl.

CPC .............. *E05B 81/22* (2013.01); *E05B 81/06* (2013.01); *E05B 81/34* (2013.01); *E05B 81/44* (2013.01); *Y10T 292/699* (2015.04)

(58) Field of Classification Search

CPC .......... E05B 81/06; E05B 81/14; E05B 81/22; E05B 81/34; E05B 81/44; E05B 15/022; Y10T 292/68; Y10T 292/696; Y10T 292/699; Y10T 292/702

See application file for complete search history.

(56) References Cited

U.S. PATENT DOCUMENTS

| | | | | |
|---|---|---|---|---|
| 2,903,288 | A | 9/1959 | Joachim et al. | |
| 5,079,964 | A * | 1/1992 | Hamada | E05B 81/25 292/201 |
| 6,581,990 | B1 * | 6/2003 | Menke | E05B 81/22 292/201 |
| 6,904,717 | B2 | 6/2005 | Clark et al. | |
| 7,234,736 | B2 * | 6/2007 | Kachouh | E05B 81/14 292/216 |
| 7,445,258 | B2 | 11/2008 | Rice et al. | |
| 9,644,404 | B2 | 5/2017 | Strole et al. | |

(Continued)

FOREIGN PATENT DOCUMENTS

| | | | | |
|---|---|---|---|---|
| CN | 110439397 | A * | 11/2019 | E05B 81/06 |
| DE | 3721963 | C1 * | 10/1988 | |

(Continued)

OTHER PUBLICATIONS

International Search Report and Written Opinion mailed Nov. 2, 2022, in Intl. App. No. PCT/US2022/033787 (11 pp).

*Primary Examiner* — Carlos Lugo
(74) *Attorney, Agent, or Firm* — Young Basile Hanlon & MacFarlane, P.C.

(57) ABSTRACT

A striker system includes a chassis, a striker, an actuator, and a controller. The striker is pivotable relative to the chassis and configured to be received by and couple to a latch. The actuator is configured to pivot the striker. The controller operates the actuator to pivot the striker relative to the chassis in a range of motion greater than 60 degrees.

17 Claims, 8 Drawing Sheets

(56) References Cited

U.S. PATENT DOCUMENTS

| | | | | |
|---|---|---|---|---|
| 9,745,773 | B2 | 8/2017 | Halliwell | |
| 10,767,397 | B2 | 9/2020 | Ottino et al. | |
| 11,512,505 | B2 * | 11/2022 | Schwickerath | E05B 81/74 |
| 2003/0011200 | A1 | 1/2003 | Oxley et al. | |
| 2005/0218670 | A1 | 10/2005 | Brose et al. | |
| 2010/0090480 | A1 * | 4/2010 | Pyun | E05B 81/22<br>292/341.15 |
| 2015/0076838 | A1 * | 3/2015 | Rajagopal | E05B 81/06<br>292/201 |
| 2017/0284134 | A1 | 10/2017 | Schwickerath et al. | |
| 2019/0017298 | A1 | 1/2019 | Sardelli et al. | |
| 2019/0017301 | A1 | 1/2019 | Cumbo | |
| 2020/0080348 | A1 | 3/2020 | Cappelli et al. | |

FOREIGN PATENT DOCUMENTS

| | | | | |
|---|---|---|---|---|
| DE | 10004242 | A1 * | 8/2000 | E05B 15/022 |
| DE | 10048051 | A1 | 4/2002 | |
| DE | 10140385 | B4 * | 6/2012 | E05B 81/22 |
| EP | 2119857 | A1 * | 11/2009 | E05B 81/14 |
| FR | 2893344 | A1 * | 5/2007 | B60J 1/1884 |
| FR | 2919647 | A1 * | 2/2009 | E05B 77/36 |

* cited by examiner

DOOR SYSTEM

CROSS-REFERENCE TO RELATED APPLICATION(S)

This application claims the benefit of U.S. Provisional Application No. 63/220,467, filed Jul. 10, 2021, the contents of which are hereby incorporated by reference herein for all purposes.

TECHNICAL FIELD

This disclosure relates to vehicles and, in particular, door systems for vehicles.

BACKGROUND

Vehicles, including passenger vehicles, include passenger and other compartments that are selectively openable by doors. The doors are movable relative to the vehicle and are further releasably coupleable to the vehicle with a door closure system. Typical door closure systems include a latch that is coupled to and positioned within a cavity of the door and a striker that is fixedly coupled to the vehicle and protrudes from a surface thereof. As the door is closed, the latch receives and releasably couples to the striker.

SUMMARY

Disclosed herein are implementations of door systems. In one implementation, a door system for a passenger vehicle generally includes a striker, an actuator, and a controller. The striker is configured to be received by and couple to a latch of a door. The actuator moves the striker. The controller operates the actuator to move the striker between and hold the striker at each of a first predetermined position in which the striker is configured to not couple to the latch of the door, a second predetermined position in which the striker is configured to be received by and couple to the latch of the door, and a third predetermined position between the first predetermined position and the second predetermined position in which the striker is configured to be coupled to the latch of the door.

The door system may further include a body structure that defines a door opening that is selectively opened and closed by the door, and the striker may be coupled to the body structure. The door system may further include the door that is movable relative to the body structure to selectively open and close the door opening, the door including the latch. The door system may further include a seal coupled to one of the door or the body structure. The striker may be pivotable relative to the body structure between the first predetermined position, the second predetermined position, and the third predetermined position. In the first predetermined position, the striker may protrude into the door opening less than in the second predetermined position and less than in the third predetermined position. In the second predetermined position, the striker may be pivoted outward from the body structure relative to the first predetermined position and protrudes into the door opening to be received by and couple to the latch. When in the third predetermined position and coupled the latch, the striker transfers a cinching force between the body structure and the door to compress the seal therebetween, the cinching force being greater than force transferred by the striker between the body structure and the door when in the second predetermined position. The striker may have a range of motion between the first predetermined position to the second predetermined position of between 60 and 120 degrees. The striker may be moved between 5 and 20 degrees from the second predetermined position to the third predetermined position. The door system may further include a cam that is moved by the actuator to pivot the striker between the first predetermined position, the second predetermined position, and the third predetermined position. The actuator may move the cam linearly. The actuator may move the cam rotationally.

In an implementation, a striker system includes a chassis, a striker, an actuator, and a controller. The striker is pivotable relative to the chassis and configured to be received by and couple to a latch of a door. The actuator is configured to pivot the striker. The controller operates the actuator to pivot the striker relative to the chassis in a range of motion greater than 60 degrees.

The striker may be pivoted by the actuator between a retracted position in which the striker is configured to not couple to the latch of the door, a presenting position in which the striker is configured to be received by and couple to the latch of the door, and a cinching position between the retracted position and the presenting position in which the striker is configured to be coupled to the latch of the door. The striker system may further include a cam system by which the actuator pivots the striker relative to the chassis. The cam system may a cam having cam slot. The striker may be coupled to a cam follower to pivot therewith. The actuator may move the cam linearly for the cam follower to move within the cam slot and pivot the striker over the range of motion. The actuator may include a motor and a lead screw rotatable by the motor and operatively coupled to the cam to move the cam linearly relative to the chassis by rotation of the lead screw. The cam system includes a cam and a cam follower with the cam coupled to the striker to rotate therewith and including a cam slot; the cam follower may be coupled to a gear and positioned within the cam slot; and the actuator may be configured to rotate the gear to move the cam follower within the cam slot and pivot the striker over the range of motion. The actuator may further include a motor, a first worm gear, and a second worm gear. The motor may rotate the first worm gear, the first worm gear may be engaged with the second worm gear to cause rotation thereof, and the second worm gear may be engaged with the gear to cause rotation thereof.

In one implementation, a door system includes a door, a door actuator, a latch, a striker, a striker actuator, and a controller. The door is movable relative to a door opening of a vehicle body between an open position and a closed position. The door actuator moves the door relative to the door opening. The latch is coupled to the door. The striker is movable relative to the vehicle body between a stowed position in which the striker is biased away from the door opening and a deployed position in which the striker is configured to be receive and couple to the latch of the door. The striker actuator moves the striker between the stowed position and the deployed position. The controller operates the door actuator and the striker actuator to move the striker from the stowed position to the deployed position while the door is moved from the open position toward the closed position.

The controller may operate the door actuator to move the striker to the stowed position while the door is moved to the open position. The striker may be movable to a cinching position from the deployed position, and the controller may operate the door actuator and the striker actuator to move the door to couple the latch to the striker in the deployed position. The controller may further operate the striker actuator to move the striker from the deployed position to the cinching position and thereby move the door to compress a seal between the door and the vehicle body. The controller may stop operating the door actuator after the latch couples to the striker in the deployed position. The controller may operate the striker actuator after the latch couples to the striker to move the striker from the deployed position to the cinching position.

DETAILED DESCRIPTION

Figure 1:
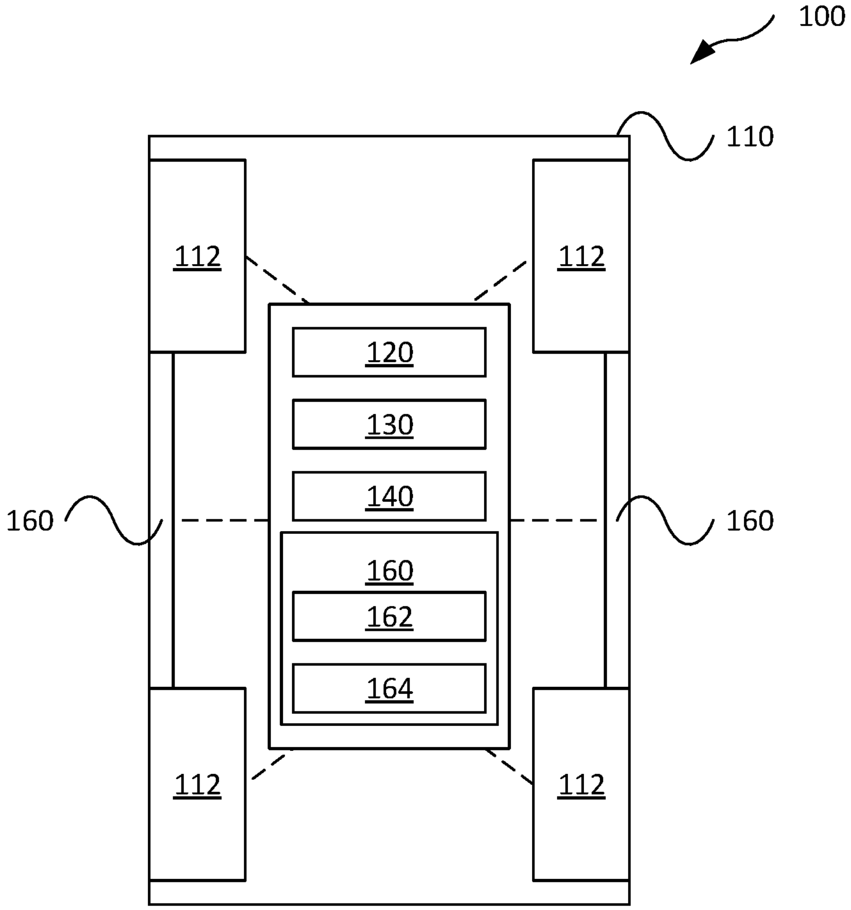
FIG. 1 is a schematic view of a passenger vehicle.

A passenger vehicle 100 generally includes a vehicle body 110, a drive system 120, a steering system 130, a braking system 140, a door system 150, and a control system 160. The vehicle body 110 is supported by wheels 112. The drive system 120 may, for example, include one or more motors that operatively coupled to the wheels 112 to cause rotation thereof to propel the passenger vehicle 100. The steering system 130 may, for example, include a motor and a rack-and-pinion that are operatively coupled to the wheels 112 to cause pivoting thereof to steer the passenger vehicle 100. The braking system 140 may, for example, include friction brakes (e.g., brake calipers, brake pads, and rotors) that are operatively coupled to the wheels 112 to slow rotation thereof to slow the passenger vehicle 100. The door system 150 is configured to provide ingress and egress of passengers and/or material goods into and out of the vehicle body 110.

The control system 160 is configured to operate each of the other systems (e.g., the drive system 120, the steering system 130, and the braking system 140, and the door system 150) in conjunction with human input devices (e.g., a steering wheel, accelerator pedal, and/or brake pedal) and/or without human input devices (e.g., for autonomous driving passengers between locations or destinations). The control system 160 may, for example, include one or more controllers 162 and one or more sensors 164 that monitor various conditions of the passenger vehicle 100 and/or the environment of the passenger vehicle 100 (e.g., position sensors, motion sensors, LIDAR sensors, RADAR sensors, cameras, among other types of sensors). The control system 160 may be configured to operate other systems of the passenger vehicle 100 including, but not limited to, infotainment systems, seating systems, suspension systems, and communications systems.

Figure 2:
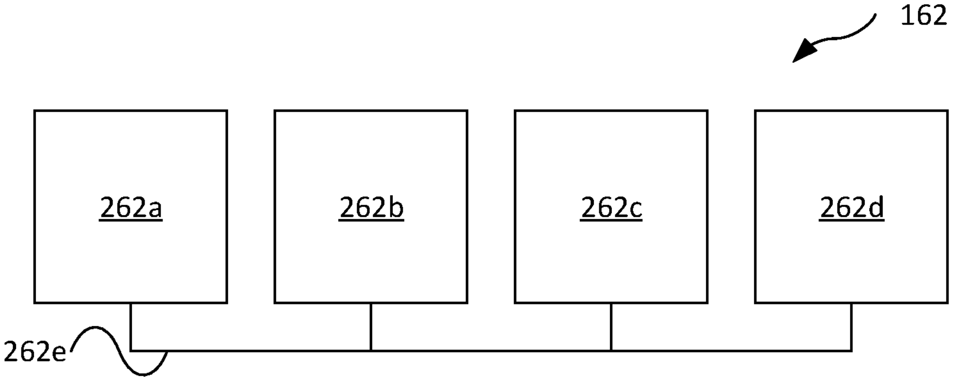
FIG. 2 is a schematic view of an example hardware configuration of a controller of the passenger vehicle.

Referring to FIG. 2, an example hardware configuration for the controller 162 is illustrated, though it should be noted that one or more of the controllers 162 may be configured as shown or have any other suitable hardware configuration capable of performing the methods and functions described herein. The controller 162 generally includes a processor 262*a*, a memory 262*b*, a storage 262*c*, a communications interface 262*d*, and a bus 262*e* by which the other components of the controller 162 are in communication with each other. The processor 262*a* may be a central processing unit or any other processing device capable of executing instructions (e.g., software programming). The memory 262*b* is a short-term, volatile storage device, such as a random access memory module. The storage 262*c* is a long-term, non-volatile storage device, such as a hard disk or solid state drive, capable of storing instructions (e.g., software programming) that are executed by the processor 262*a*. The communications interface 262*d* is capable of sending from and/or receiving to the controller 162, for example, sending control signals to the various other systems described herein and/or receiving various signals therefrom and/or from the sensors 164.

Figure 3:
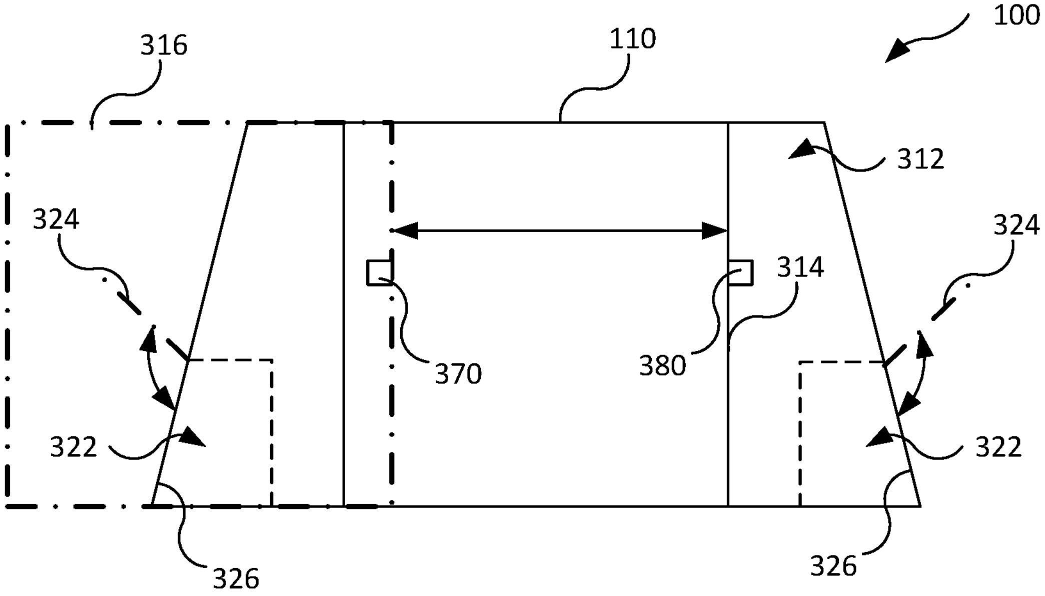
FIG. 3 is a side view of the passenger vehicle.
Figure 4:
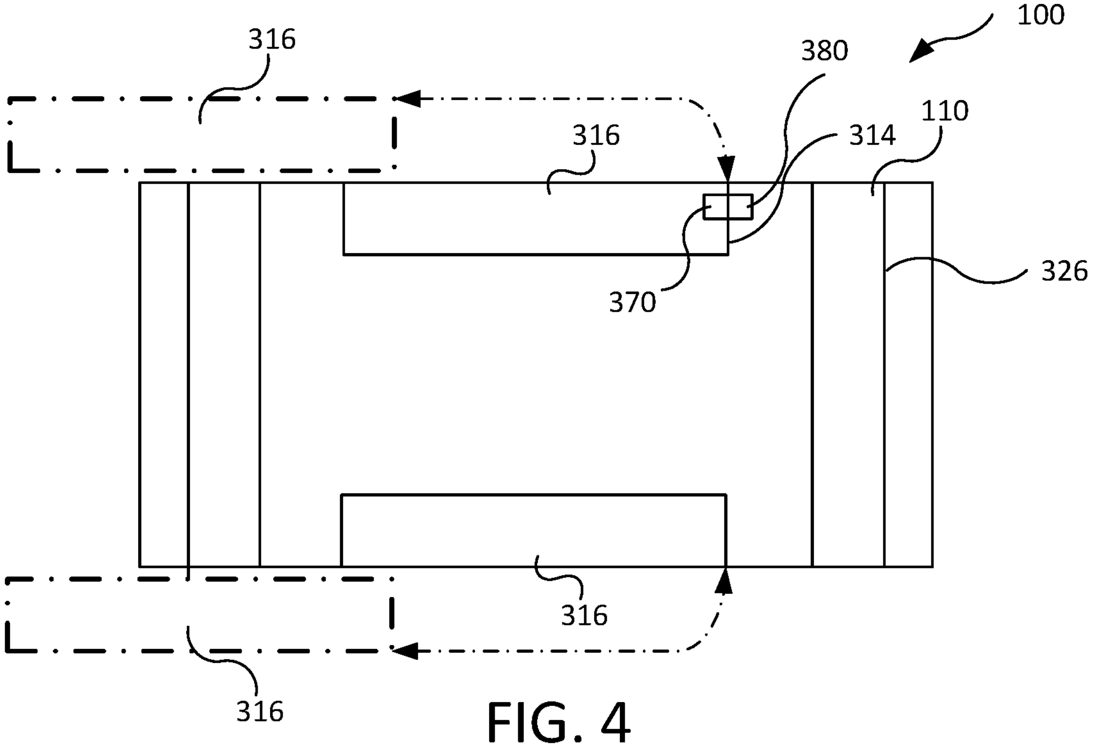
FIG. 4 is a top view of the passenger vehicle.

Referring to FIGS. 3 and 4, the vehicle body 110 defines a passenger compartment 312 and may further include one or more storage compartments 322. Each of the storage compartments 322 may be physically isolated from the passenger compartment 312 or may be in communication therewith, for example, being separated therefrom by a passenger seat (not shown).

The passenger compartment 312 is configured to receive passengers and their possessions or other items (e.g., cargo) therein for transport by the passenger vehicle 100. The vehicle body 110 defines one or more passenger door openings 314 and includes one or more passenger doors 316 that are movable relative to the passenger door openings 314, so as to selectively open and close the passenger door openings 314. The passenger doors 316 thereby allow ingress and egress of passengers into and out of, respectively, the passenger compartment 312. As shown, the vehicle body 110 may include one of the passenger door openings 314 and one of the passenger doors 316 on each side of the passenger vehicle 100 (e.g., left and right sides), one of the passenger doors 316 functionally associated with one of the passenger door openings 314 to open and close the passenger door opening 314. As shown, the passenger doors 316 may be sliding doors that move relative to the passenger door opening 314 in a sliding motion. In FIGS. 3 and 4, the passenger door 316 is depicted in heavy weight dash-dot lines in an open position. Alternatively, the vehicle body 110 may include a different number of the passenger door openings 314 (e.g., one, three, four, or more) and a different number of the passenger doors 316 functionally associated with each of the passenger door openings 314 (e.g., two). Furthermore, rather than being configured as sliding doors, the passenger doors 316 may instead be rotatable doors (e.g., to pivot relative to the passenger door opening 314 functionally associated therewith, for example, via a hinge or linkage) or otherwise configured to be coupled to the vehicle body 110 and movable relative to the passenger door opening 314 associated therewith.

The one or more storage compartments 322, which may include a rear storage compartment (e.g., a trunk) and/or a forward storage compartment (e.g., a frunk), are accessible from an exterior of the passenger vehicle 100 and are configured to receive therein items for transport. The vehicle body 110 defines one or more storage door openings 324 and includes one or more storage doors 326 that are movable relative to the storage door openings 324, so as to selectively open and close the storage door openings 324 to allow users to insert or remove items from the storage compartments 322. As shown, the vehicle body 110 may include two of the storage door openings 324 and two of the storage doors 326, each of one of the storage doors 326 functionally associated with one of the storage door openings 324 (e.g., for the front and the rear ones of the storage compartments 322). As shown, each of the storage doors 326 is vertically rotatable relative to the storage door openings 324 (e.g., pivotable about a generally horizontal axis), for example, via a hinged or linkage connection. In FIGS. 3 and 4, the storage doors 326 are depicted in heavy weight dash-dot lines in an open position. The passenger vehicle 100 may instead include other numbers (more or less, such as none) of the storage compartments 322, the storage door openings 324, and the number of storage doors 326.

As discussed in further detail below, the vehicle body 110 further includes a latch 370 and a striker 380, which are depicted schematically in FIGS. 3 and 4, associated with one or more of the passenger doors 316 and/or the storage doors 326 (not shown) to hold such doors in the closed positions and to close (e.g., seal) the passenger door opening 314 or the storage door opening 324. One of the passenger doors 316, the storage doors 326, the latch 370, and the striker 380 may be considered to form a door system that may be considered to still further include a portion of the vehicle body 110 and/or a seal therebetween. Further details of the latch 370 and the striker 380 are discussed in further detail below.

Figure 5:
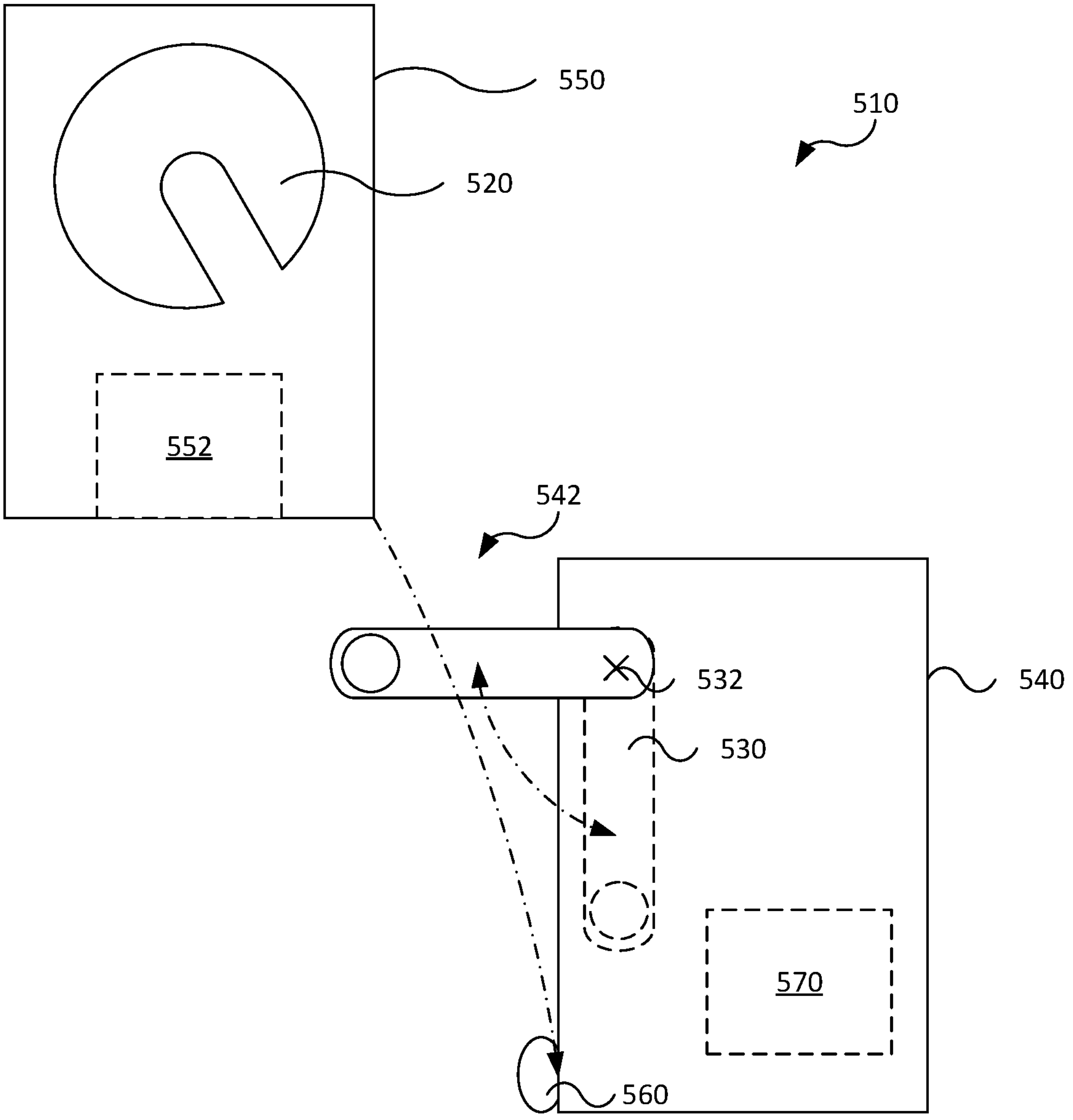
FIG. 5 is a top view of a door system of the passenger vehicle in a first predetermined position.
Figure 6:
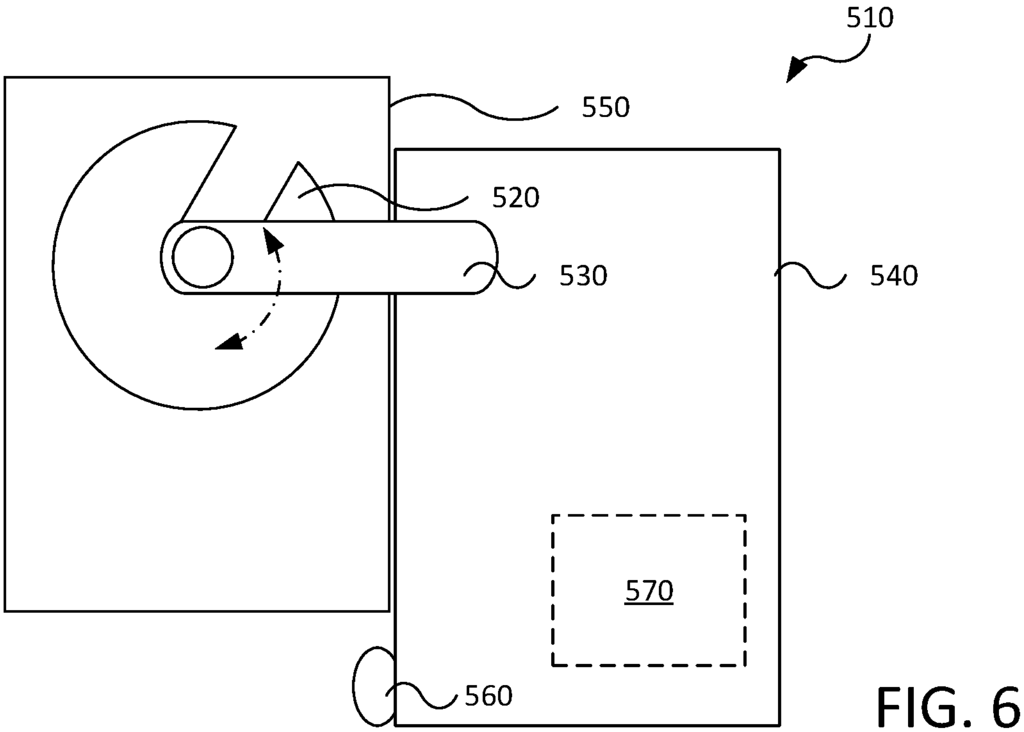
FIG. 6 is a top view of the door system in a second predetermined position.
Figure 7:
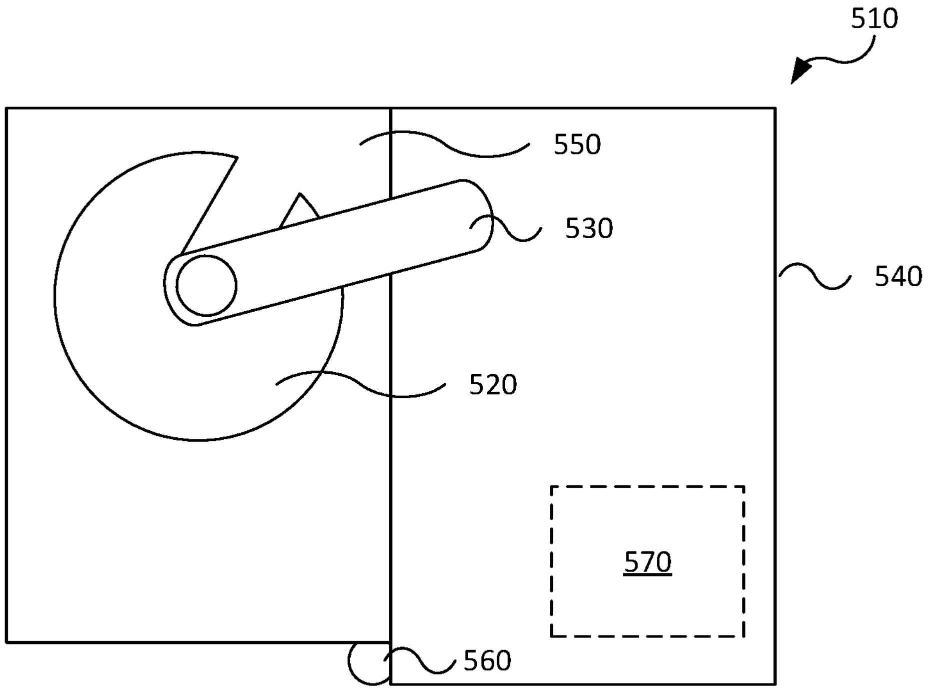
FIG. 7 is a top view of the door system in a third predetermined position.
Figure 8:
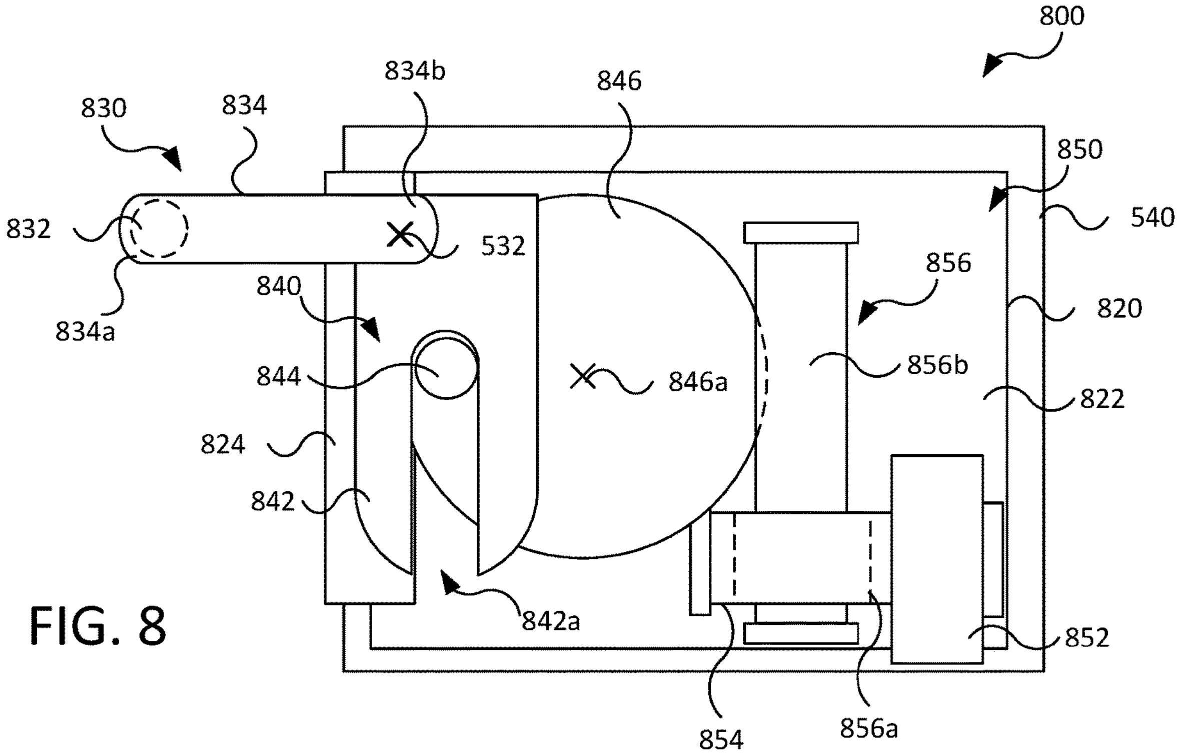
FIG. 8 is a top view of a first embodiment of a striker system of the door system in the second predetermined position.

Referring to FIGS. 5-7, a door system 510 generally includes a latch 520 and a striker 530, which may form the latch 370 and the striker 380 described previously. The door system 510 may also be considered to include a body structure 540 and/or a door 550, and may be considered to still further include a seal 560 and/or a door control system 570. The latch 520 and the striker 530 may also be considered to form a door closure system. The body structure 540 may be part of the vehicle body 110 and form, partially or wholly, a door opening 542 (e.g., the passenger door opening 314 or the storage door opening 324). The door 550 may be one of the passenger doors 316 or the storage doors 326. The door 550 may include a door actuator 552 (indicated schematically) that functions to move the door 550 relative to the body structure 540, for example, including an electric motor and other suitable components for supporting and guiding movement of the door 550 relative to the body structure 540 in a predetermined path (e.g., sliding or rotating). The seal 560 is coupled to one of the body structure 540 (as shown) or the door 550, surrounding the door opening 542, and is compressed between the body structure 540 and the door 550 to form a seal therebetween about the door opening 542 (e.g., a waterproof seal). The door control system 570 is configured to operate the door system 510, including various operations related to the latch 520, the striker 530, and/or the door actuator 552. The door control system 570 may be considered part of the control system 160 and includes a controller 162.

The latch 520 is coupled to the door 550. The striker 530 is coupled to the body structure 540. As illustrated in FIGS. 5-7, the striker 530 is configured to move between and be held in at least three predetermined positions that include a first predetermined position (e.g., a stowed or retracted position; depicted in dashed lines in FIG. 5), a second predetermined position (e.g., a deployed, receiving, or presenting position; depicted in solid lines in FIGS. 5 and 6), and a third predetermined position (e.g., a cinching or compressing position; depicted in solid lines in FIG. 7). As the door 550 moved from an open position to a closed position (e.g., along the longer dash-dot line in FIGS. 4 and 5), the striker 530 moves from the first predetermined position to the second predetermined position and is then engaged (e.g., received) by the latch 520, which then releasably couples to the striker 530 (e.g., by rotating, as illustrated). The striker 530 is then moved from the second predetermined position to the third predetermined position, so as to draw the door 550 closer to the body structure 540 and/or to compress the seal 560 therebetween. For example, as shown, the striker 530 may be configured to rotate about an axis 532 between the first, second, and third predetermined positions.

The striker 530 may also be considered to have a range of travel that extends from the first predetermined position to the second predetermined position and includes the third predetermined position. The range of travel of the striker 530 may, for example, be between 40 mm and 100 mm, such as between 50 mm and 80 mm. The range of travel of the striker 530 follows a predetermined path that is a partial circle about the axis 532. As such, the range of motion of the striker 530 may be defined angularly and be, for example, greater than 60 degrees, such between 60 and 120 degrees (e.g., between 75 and 105 degrees, such as 90 degrees or less).

As shown in FIG. 5, in the first predetermined position of the striker 530 (illustrated in dashed lines), as compared to the second predetermined position and the third predetermined position, the striker 530 is biased toward the body structure 540, so as to protrude the smallest distance of the first, second, and third predetermined positions into the door opening 542 defined by the body structure 540. In the first predetermined position, the striker 530 may be recessed into the body structure 540 (as shown), recessed into an intervening structure (e.g., a housing of an assembly of the structure, such as an external structure 824 described below), and/or be positioned adjacent to the body structure 540.

As shown in FIGS. 5 and 6 the striker 530, in the second predetermined position illustrated in solid lines, is biased away from the body structure 540 and furthest from the first predetermined position. In the second predetermined position, the striker 530 is pivoted outward from the body structure 540 relative to the first predetermined position and protrudes from the body structure 540 into the door opening 542 defined thereby, so as to be received by the latch 520 of the door 550. The latch 520 may be moved in a predominantly cross-car direction with the door 550 as the door 550 is closed and the latch 520 engages the striker 530. The cross-car direction may be left-to-right if the door 550 is on a left side of the passenger vehicle 100 (as illustrated by the dash-dot arrow) or right-to-left if the door 550 is on a right side of the passenger vehicle 100. For example, as the latch 520 engages the striker 530, the latch 520 may be traveling in a direction that is within 30, 20, 10 degrees or less of the cross-car direction (e.g., that is horizontal and perpendicular to a primary or forward direction of travel of the passenger vehicle 100).

As shown in FIG. 7, in the third predetermined position, the striker 530 is biased away from the body structure 540 and in between the first predetermined position and the second predetermined position. In the third predetermined position, the striker 530 is biased away from the second predetermined position) toward the first predetermined position a distance of 12 mm, 10 mm, 8 mm or less (e.g., between 5 and 10 mm, or less than 30 degrees, such as between 5 and 20 degrees). The distance between the second predetermined position and third predetermined position may be referred to as a cinching or compressing distance.

After the latch 520 couples to the striker 530, the striker 530 moves from the second predetermined position to the third predetermined position and pulls the door 550 toward the body structure 540 to compress the seal 560 therebetween. Furthermore, while in the third predetermined position, the striker 530 applies a higher constant force (e.g., a cinching force) to the door 550 (e.g., the latch 520 thereof) and, thereby between the door 550 and the body structure 540, than in either the first predetermined position or the second predetermined position. In the first position, the striker 530 is configured to not couple and/or apply force to the latch 520 or the door 550. In the second predetermined position, the striker 530 is configured to be received and engaged by the latch 520 at a lower constant force, such as to partially compress the seal 560, albeit possibly contacting the latch 520 with a higher initial but momentary force). The striker 530 may be configured to not be received by the latch in the third predetermined position.

Referring to FIGS. 8-11 and 12-14, different embodiments of striker systems are described, which are configured to move the striker 530 between and hold (e.g., maintain) the striker 530 at each of the first, second, and third predetermined positions as described previously.

Referring to FIGS. 8-11, a striker system 800 includes a chassis 820, a striker 830, a cam system 840, and an actuator 850. The chassis 820 is coupled to and supports the striker 830, the cam system 840, and the actuator 850 and is in turn coupleable to and supported by the body structure 540. The striker 830 is movably supported by the chassis 820, for example, being pivotable relative thereto about the axis 532. The cam system 840 is configured to move the striker 830 between the first, second, and third predetermined positions and itself is moved by the actuator 850. The striker system 800 may be considered to further include the door control system 570, such as the controller 162 (or a sub-controller thereof), which functions to operate the striker system 800. The striker system 800 may also be referred to as a door system or a door subsystem, and the door system 500 may be considered to include the striker system 800.

The chassis 820, as referenced above, is coupled to and supports the striker 830, the cam system 840, and the actuator 850, and is in turn coupled to the body structure 540. For example, the chassis 820, the cam system 840, and the actuator 850 may be positioned within a cavity of the body structure 540 of the vehicle body 110, such as an A-pillar, B-pillar, or C-pillar, so as to be hidden from view. The chassis 820 may, for example, include an internal support structure 822 to which the striker 830, the cam system 840, and the actuator 850 are coupled to and supported inside the body structure 540. The chassis 820 may also include an external structure 824 that is external to the body structure 540 and visible when the door 550 is opened. The external structure 824, for example, may be positioned in an aperture of the body structure 540 through which the striker 830 protrudes. The external structure 824 may further define a recess into which the striker 830 is received in the first predetermined position. The external structure 824 may be formed as a unitary structure with internal support structure 822 or may be separately formed and coupled thereto. Further aspects of the chassis 820 are discussed in further detail below with respect to the striker 830, the cam system 840, and the actuator 850. The external structure 824 is discussed in further detail below with respect to FIG. 11.

The striker 830 generally includes a bar 832 and two arms 834. The bar 832 generally extends upright (e.g., vertically) between the two arms 834 and is configured to be received by the latch 520 but may alternatively be arranged in any other direction (e.g., horizontally). The bar 832 may be generally cylindrical.

The two arms 834 (e.g., upper and low arms) extend from opposite ends (e.g., upper and lower ends of the bar 832). The arms 834 may be configured as generally flat, planar structures or have any other suitable shape. A proximal end **834*a* of each of the two arms is coupled to the bar 832, while a distal end 834*b* of each of the two arms 834 forms a pivot about which the striker 830 rotates relative to the chassis 820 (e.g., are pivotably coupled thereto). The proximal ends 834*a* positioned outside the body structure 540 (e.g., so as to be visible when the door 550 is open), while the proximal ends 834*a* may be positioned within the body structure 540 or otherwise hidden from view. The two arms 834 may be formed as a unitary (e.g., monolithic) structure with each other and/or the bar 832**, for example, with a metal material via a casting, machining, or other process or combinations thereof.

The cam system 840 generally includes a cam 842, a cam follower 844, and a gear 846. The cam 842 is a plate-like structure that is fixedly coupled to the striker 830 (e.g., an upper one of the arms 834) and rotates therewith about the axis 532 relative to the chassis 820 and the body structure 540. The cam 842 defines a cam slot **842*a* in which the cam follower 844 is positioned and moves therein. The cam follower 844 is a wheel or other slider that is coupled to the gear 846. As the gear 846 is rotated by the actuator 850 (discussed in further detail below) about another axis 846*a*, which is laterally offset from the axis 532 (e.g., away from the door opening and inboard relative thereto), the cam follower 844 rotates about the axis 846*a* and moves within the cam slot 842*a* to engage and move the cam 842 and striker 830 about the axis 532. The striker 830 is thereby moved about the axis 532 between the first, second, and third predetermined positions. The cam follower 844 may be considered to have another range of travel that follows a predetermined path of travel that is a portion of a circle about the axis 846*a*. The range of motion of the gear 846 and the cam follower 844** thereon may, for example, be between 150 and 320 degrees, such as between 240 and 300 degrees.

Figure 9:
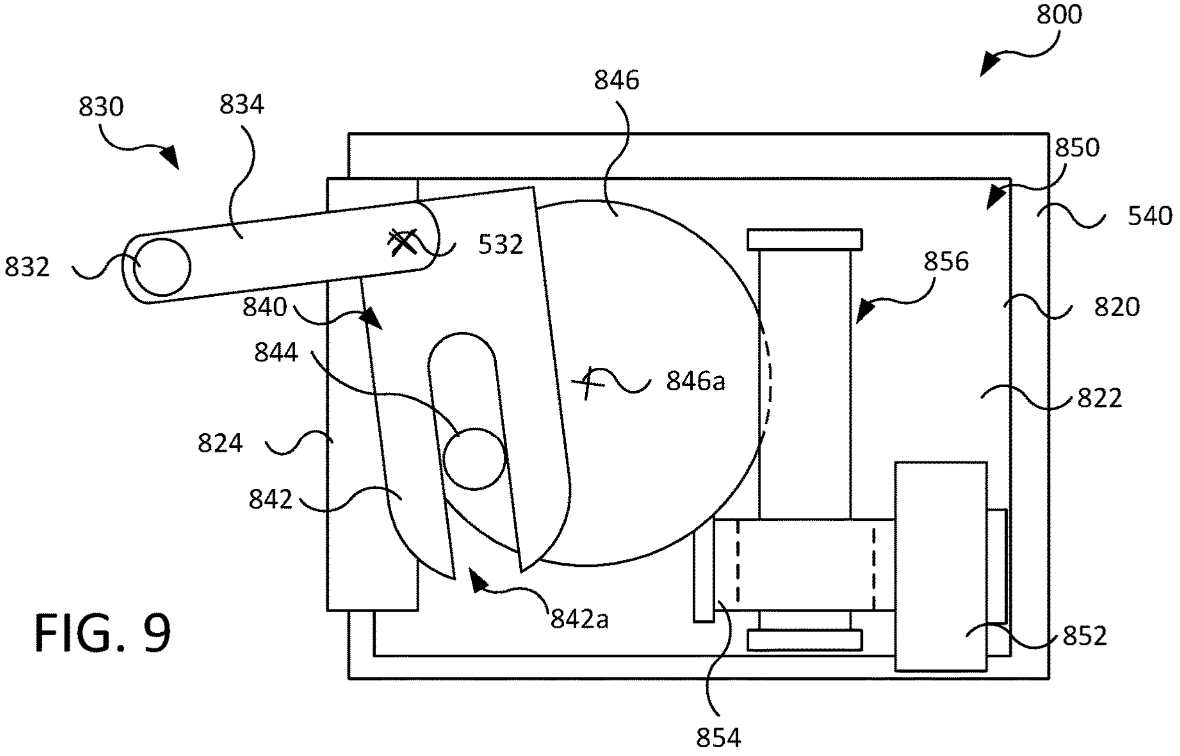
FIG. 9 is a top view of the first embodiment of the striker system in the third predetermined position.
Figure 10:
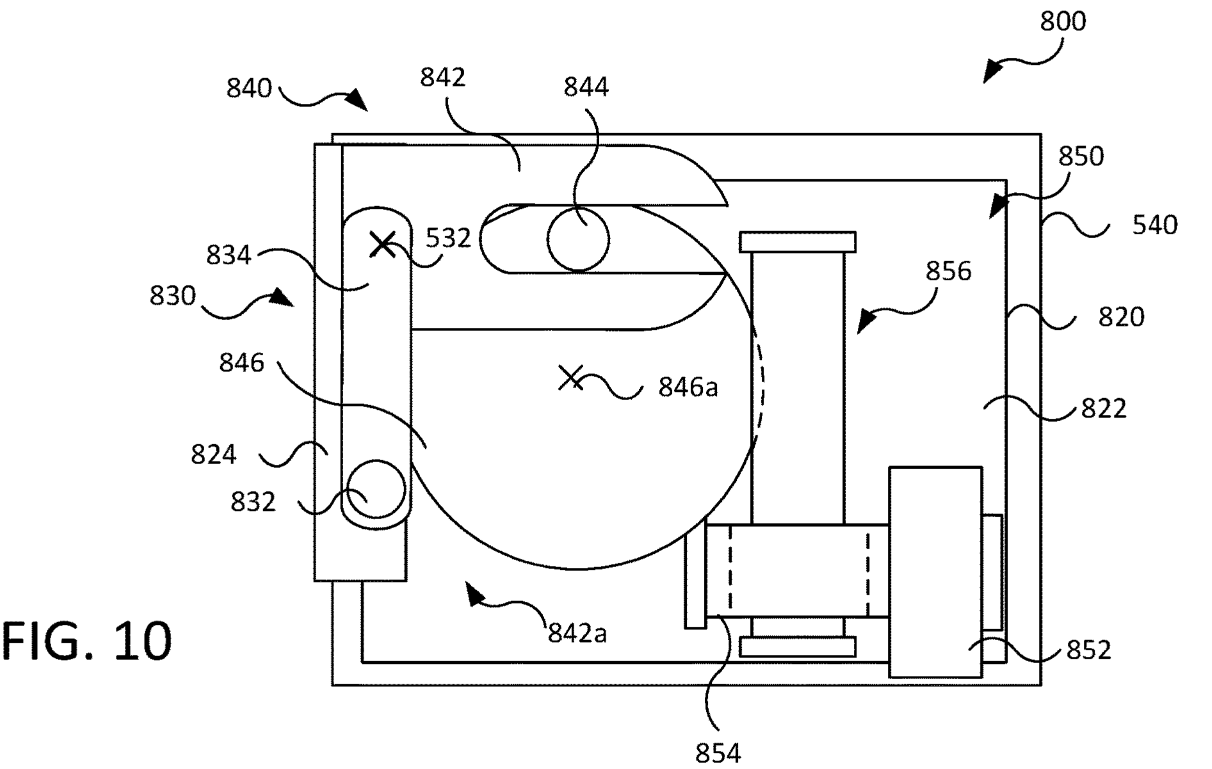
FIG. 10 is a top view of the first embodiment of the striker system in the second predetermined position.

The striker 830 and the cam system 840 are cooperatively configured such that over the range of the travel of the striker 830 (e.g., as described for the striker 530), the striker 830 moves more quickly and with lower torque about the axis 532 over a majority of the travel from the first predetermined position (shown in FIG. 10) to the second predetermined position (shown in FIG. 8) than over the travel from the second predetermined position to the third predetermined position (shown in FIG. 9).

The cam slot **842*a* may be configured for the striker 830 to move over the entire range of motion of the gear 846 (e.g., being straight as shown), such that any movement of the gear 846 and the cam follower 844 thereon causes movement of the cam 842. Alternatively, the cam slot 842***a* may be configured with dwell regions that correspond to the first predetermined position and the second predetermined position of the striker 830, which permit the gear 846 to continue move while not causing movement of the cam 842. By including such dwell regions, the striker 830 may be reliably positioned in the first and/or second predetermined positions despite imprecise operation of the actuator 850 and movement of the gear 846.

The actuator 850 is operated by the door control system 570 to move the striker 830 between the first, second, and third predetermined positions. The actuator 850 includes an electric motor 852, a first worm gear 854, and a pinion 856 having a pinion gear 856*a* and a second worm gear 856*b* rotatably fixed to each other. The electric motor 852 drives the first worm gear 854 to be rotated thereby. The first worm gear 854 is engaged with the pinion gear 856*a* of the pinion 856 so as to rotate the pinion 856 and, thereby, the second worm gear 856*b*. The second worm gear 856*b* is engaged with teeth on the outer periphery of the gear 846, so as to cause rotation of the gear 846 about the axis 846*a* thereof. One or both of the first worm gear 854 and/or the second worm gear 856*b* are not backdrivable, such that the striker 830 may be maintained in the first, second, and third predetermined positions despite force being applied thereto in instantaneous and/or constant manners, for example, when the striker 830 is first engaged by the latch 520 when in the second predetermined position (e.g., instantaneous force) and when the striker 830 compresses the seal 860 in the third predetermined position (e.g., constant force). Each of the electric motor 852, the first worm gear 854, and the pinion 856 are coupled to and supported by the internal support structure 822 of the chassis 820, such as with bearings on the ends thereof (illustrated, not labeled). It should be understood that each of the gear 846, the first worm gear 854, the pinion gear 856*a*, and the second worm gear 856*b* include teeth that are configured to mesh with the teeth and cause rotation of that other component engaged therewith (e.g., the first worm gear 854 and the pinion gear 856*a*). The actuator 850 may also be referred to as a striker actuator or an actuator system. The actuator 850 may also be referred to as a striker actuator or an actuator system, and may be considered to include the cam system 840.

Figure 11:
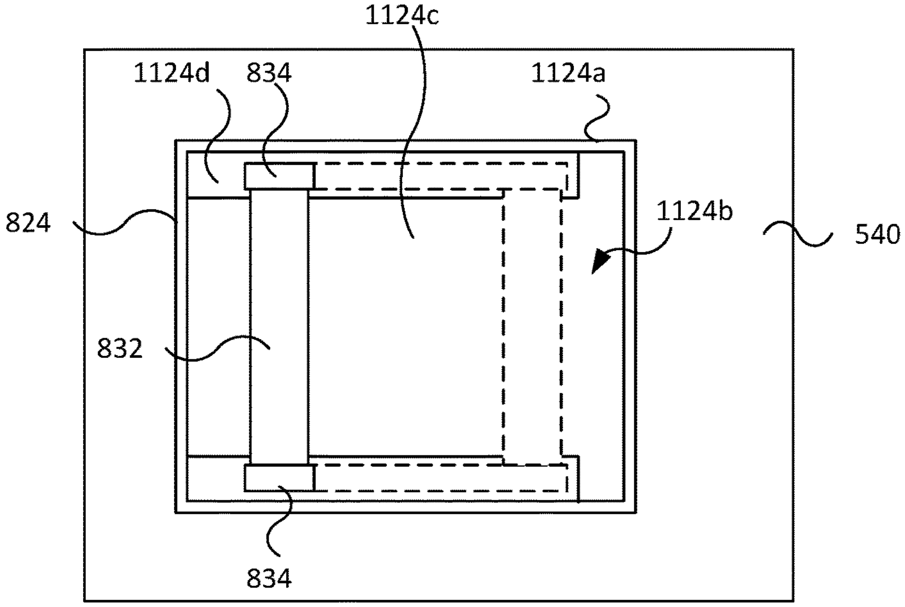
FIG. 11 is an elevation view of the striker system in the second predetermined position (solid lines) and the first predetermined position (dashed lines).

Referring to FIG. 11, the external structure 824 of the chassis 820 is external to the body structure 540 and visible when the door 550 is opened. The external structure 824 may, for example, conceal the internal components of the striker system 800, such as the cam system 840 and the actuator 850. The external structure 824 may, for example, include a peripheral flange 1124*a* and a plate 1124*c*. The peripheral flange 1124*a* may protrude through the body structure 540 into the door opening 542. The plate 1124*c* generally extends across the peripheral flange 1124*a*. The peripheral flange 1124*a* and the plate 1124*c* may cooperatively define a recess 1124*b* in which the bar 832 of the striker 830 is positioned when in the first predetermined position. The external structure 824 may also include slots 1124*d* through which the arms 834 of the striker 830 extend from inside the body structure 540 to outside thereof. The slots 1124*d* are configured for the arms 834 to move therein as the striker 830 is rotated between the first predetermined position (illustrated in dashed lines in FIG. 11), second predetermined position (illustrated in solid lines in FIG. 11), and the third predetermined position (not illustrated in FIG. 11). The slots 1124*d* may be defined by and/or between one, the other, or both of the peripheral flange 1124*a* and the plate 1124*c* of the external structure 824.

Figure 12:
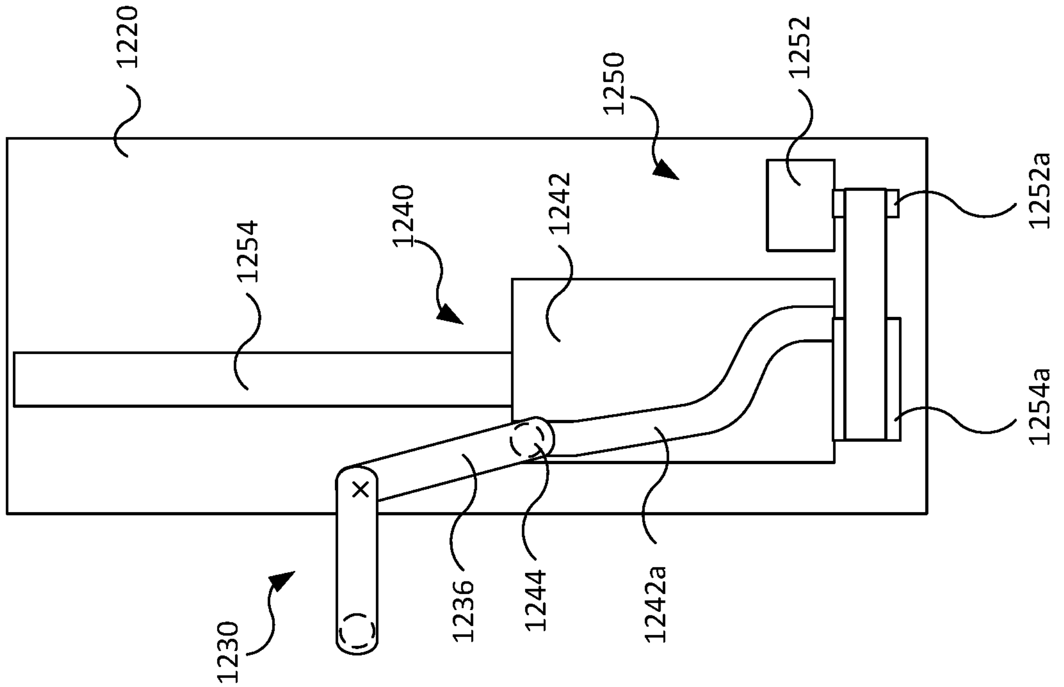
FIG. 12 is a top view of a second embodiment of a striker system of the door system in the second predetermined position.
Figure 13:
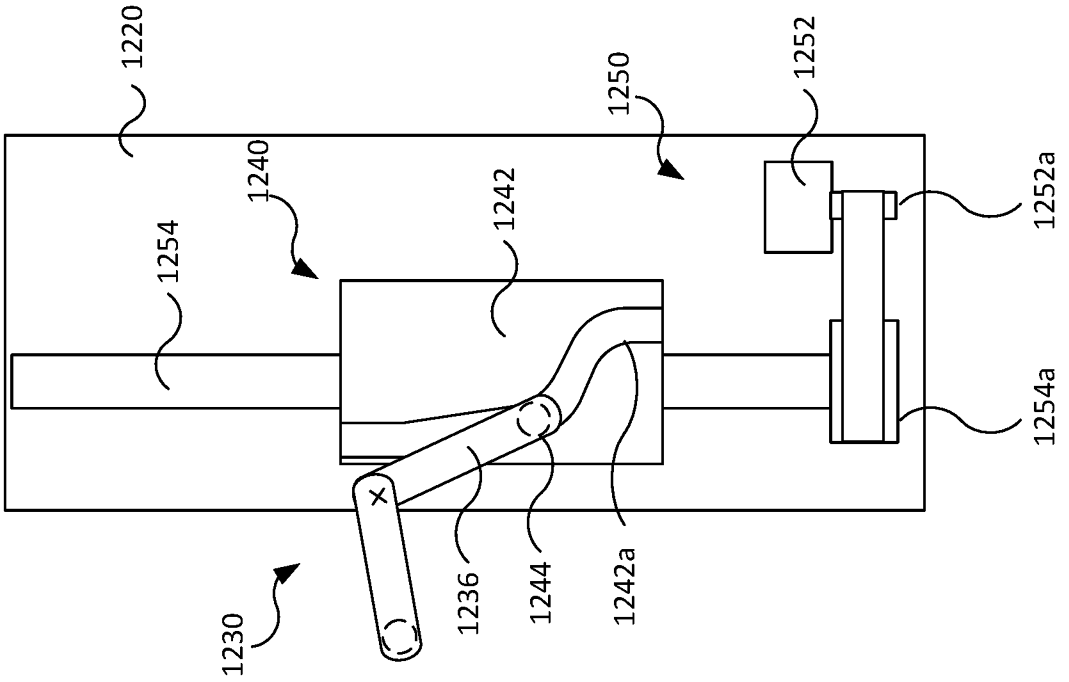
FIG. 13 is a top view of the second embodiment of the striker system in the third predetermined position.
Figure 14:
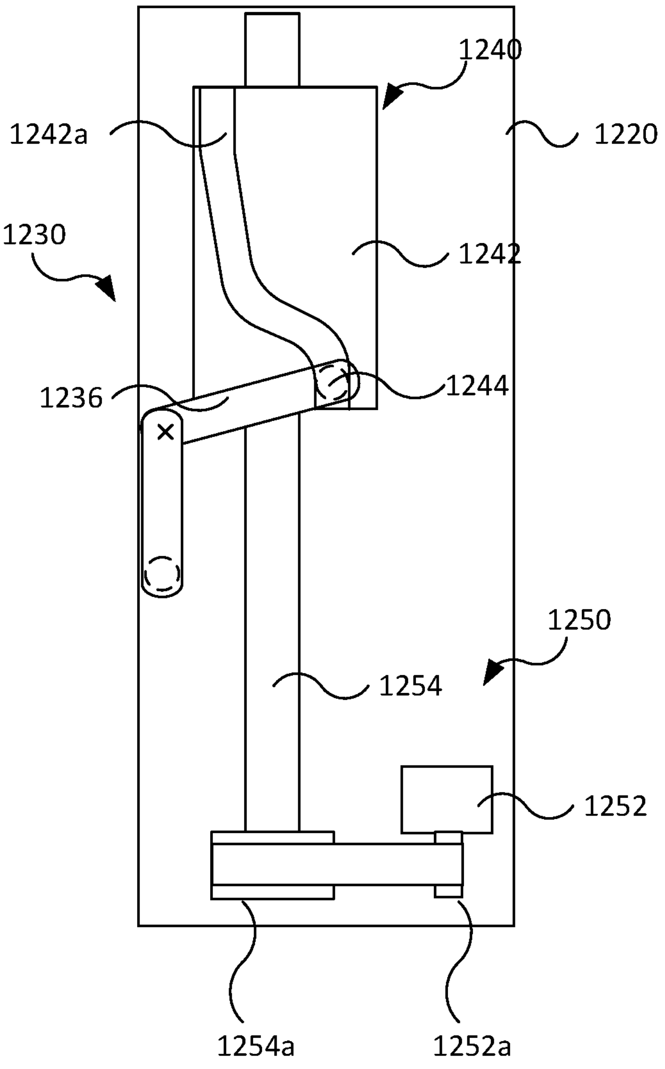
FIG. 14 is a top view of the second embodiment of the striker system in the second predetermined position.

Referring to FIGS. 12-14, a striker system 1200 includes a chassis 1220, a striker 1230, a cam system 1240, and an actuator 1250. The chassis 1220 is coupled to and supports the striker 1230, the cam system 1240, and the actuator 1250 and is in turn coupleable to and supported by the body structure (not shown). The striker 1230 is movably supported by the chassis 1220, for example, being pivotable relative thereto. The cam system 1240 is configured to move the striker 1230 between the first, second, and third predetermined positions and itself is moved by the actuator 1250. The striker system 1200 may be considered to further include the door control system 570 and the controller 162 (or a sub-controller thereof), which functions to operate the striker system 1200. Furthermore, the striker system 1200 may also be referred to as a door system or a door subsystem, and the door system 500 may be considered to include the striker system 1200.

The chassis 1220 is configured generally as described above for the chassis 820 and is coupled to and supports the striker 1230, the cam system 1240, and the actuator 1250, and is in turn coupled to the body structure 540 (not shown). The chassis 1220 may, for example, include an internal support structure and an external structure (e.g., as generally described for the internal support structure 822 and the external structure 824 described previously).

The striker 1230 is generally configured as described above for the striker 830, for example, including a bar and two arms (e.g., as generally described for the bar 832 and the two arms 834).

The cam system 1240 generally includes a cam 1242 and a cam follower 1244. The cam 1242 is a block or other structure that is movable linearly by the actuator 1250 along the chassis 1220. The chassis 1220 and the cam 1242 may be configured to provide linear movement therealong and prevent rotation of the cam 1242 relative thereto, for example, by having a track or other guide therebetween.

The cam 1242 defines a cam slot 1242*a* in which the cam follower 1244 is positioned and moves therein. The cam follower 1244 is a wheel or other slider that is fixedly coupled to the striker 1230, for example, via an arm 1236 extending from one of the arms 834 thereof. As the cam 1242 is moved linearly by the actuator 1250 (discussed in further detail below), the cam follower 1244 is engaged by the cam 1242 and follows the profile of the cam slot 1242*a* therein to cause the striker 1130 to pivot about the axis 532.

Similar to the striker 830 and the cam system 840, the striker 1230 and the cam system 1240 are cooperatively configured such that over the range of the travel of the striker 1230, the striker 1230 moves more quickly and with lower torque about the axis 532 over a majority of the travel from the first predetermined position (shown in FIG. 14) to the second predetermined position (shown in FIG. 12) than over the travel from the second predetermined position to the third predetermined position (shown in FIG. 12). The range of motion of the striker 1230 may be as described for the striker 830.

As shown, the cam slot 1242*a* may be configured with dwell regions that correspond to the first predetermined position and the second predetermined position of the striker 1230, which permit the cam 1242 to continue to move while not causing movement of the striker 1230. The cam slot 1242*a* may instead or additionally include a dwell region that corresponds to the third predetermined position of the striker 1230. As shown, the dwell regions are configured as portions of the cam slot 1242*a* that extend parallel with the direction of linear travel of the cam 1242. By including such dwell regions, the striker 830 may be reliably positioned in the first, second, and/or third predetermined positions despite imprecise operation of the actuator 1250.

The actuator 1250 is operated by the door control system 570 to move the striker 1230 between the first, second, and third predetermined positions. The actuator 1250 includes an electric motor 1252, a lead screw 1254, and a drive belt 1256 that operatively interconnects the electric motor 1252 with the lead screw 1254. The lead screw 1254 is operatively connected to the cam 1242 to move the cam linearly relative to the chassis by rotation of the lead screw 1254. The electric motor 1252 includes an output pulley 1252*a* and the lead screw 1254 includes an input pulley 1254*a* around which extend the drive belt 1256 and which are cooperatively configured to decrease the speed and increase torque input to the lead screw 1254 relative to output of the electric motor 1252. The actuator 1250 may also be referred to as a striker actuator or an actuator system, and may be considered to include the cam system 1240.

The control system 160 (e.g., one or more of the controllers 162 thereof) may be configured to operate the door system 150 in various manners so as to conceal and/or limit protrusion of the various strikers into the door openings described herein. For example, when closing the door, the control system 160 may be configured to operate the door actuator (e.g., the door actuator 552) to move from the open position toward and/or substantially to the closed position and is further configured to operate the striker actuator (e.g., the actuator 850 or the actuator 1250) to move the striker between the first, second, and third predetermined positions. For example, while the control system 160 operates the door actuator to move the door from the open position toward the closed position, the control system 160 may simultaneously operate the striker actuator to move the striker from the first predetermined position (e.g., the stowed position) to the second predetermined position (e.g., the deployed position) in which the striker is receivable by the latch of the door to couple thereto and thereby couple the door to the vehicle body.

Subsequent to the latch of the door coupling to the striker while in the deployed position, the control system operates the striker actuator to move the striker from the second predetermined position to the third position (e.g., the cinching position), thereby pulling the door toward the body structure to compress a seal therebetween.

The door actuator may be configured to move the door to a substantially closed position in which the latch is coupled to the striker but in which the seal is not fully compressed. The striker actuator subsequently moves the striker to the third predetermined position and thereby move the door from the substantially closed position to the closed position. The control system 160 may be configured to operate the striker actuator to move the striker to the cinching position only after the latch is coupled to the striker in the deployed position. The control system 160 may be further configured to stop operating the door actuator to move the door after the latch is coupled to the striker and/or before operating the striker actuator to move the striker to the cinching position.

The door may be considered to have a range of travel between the open position and the closed position, and the control system may be configured to operate the door actuator and the striker actuator such that the striker is not moved from the stowed position until the door has moved a sufficient distance within the range of travel from the open position (e.g., 30%, 50%, 60%, 70% or more thereof).

When opening the door, the control system 160 may be configured to operate the door actuator and the striker actuator simultaneously to move the door to the open position and the striker to the first predetermined position (e.g., after the latch is decoupled from the striker). Furthermore, the control system 160 may be configured to first operate the striker actuator to move the striker from the third predetermined position to the second predetermined position and, thereby, the door from the closed position to the substantially closed position, and subsequently operate the door actuator to move the door toward the open position.

As described above, one aspect of the present technology is the gathering and use of data available from various sources for passenger transport. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to transport person or objects between desired locations or destinations. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, passenger transport, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, destinations may be determined based on non-personal information data or a bare minimum amount of personal information, such as the content being requested by the device associated with a user, other non-personal information, or publicly available information.

What is claimed is:

1. A striker system for a vehicle door, comprising:
- a chassis;
- a striker pivotable relative to the chassis and configured to couple to a latch of a door;
- a cam system including:
  - a cam coupled to the striker to rotate with the striker, the cam including a cam slot that extends orthogonal to the striker; and
  - a cam follower coupled to a gear and positioned within the cam slot;
- an actuator configured to rotate the gear to move the cam follower within the cam slot to pivot the striker relative to the chassis in a range of motion greater than 60 degrees; and
- a controller that operates the actuator.

2. The striker system according to claim 1, wherein the striker is pivoted by the actuator between a retracted position in which the striker is configured to not couple to the latch of the door, a presenting position in which the striker is configured to be received by and couple to the latch of the door, and a cinching position between the retracted position and the presenting position in which the striker is configured to be coupled to the latch of the door.

3. The striker system according to claim 1, wherein the actuator further includes a motor, a first worm gear, and a second worm gear, wherein the motor rotates the first worm gear, the first worm gear is engaged with the second worm gear to cause rotation thereof, and the second worm gear is engaged with the gear to cause rotation thereof.

4. The striker system according to claim 1, wherein the cam slot is configured such that any movement of the gear and the cam follower results in movement of the cam.

5. A door system for a vehicle, comprising:
- a door that is movable relative to a door opening of a vehicle body between an open position and a closed position;
- a door actuator that moves the door relative to the door opening;
- a latch coupled to the door;
- a striker that is movable relative to the vehicle body between a stowed position in which the striker is biased away from the door opening and a deployed position in which the striker is configured to be received by and couple to the latch of the door;
- a cam system including:
  - a cam coupled to the striker, the cam including a cam slot that extends orthogonal to the striker; and
  - a cam follower positioned within the cam slot;
- a striker actuator that moves the cam follower to move the striker between the stowed position and the deployed position; and
- a controller that operates the door actuator and the striker actuator to move the striker from the stowed position to the deployed position while the door is moved from the open position toward the closed position.

6. The door system according to claim 5, wherein the controller operates the door actuator to move the striker to the stowed position while the door is moved to the open position.

7. The door system according to claim 5, wherein the striker is movable to a cinching position from the deployed position, the controller operates the door actuator and the striker actuator to move the door to couple the latch to the striker in the deployed position, and the controller further operates the striker actuator to move the striker from the deployed position to the cinching position and thereby move the door to compress a seal between the door and the vehicle body.

8. The door system according to claim 7, wherein the controller stops operating the door actuator after the latch couples to the striker in the deployed position.

9. The door system according to claim 8, wherein the controller operates the striker actuator after the latch couples to the striker to move the striker from the deployed position to the cinching position.

10. A door system for a passenger vehicle, comprising:
- a striker configured to couple to a latch of a door;
- an actuator that moves the striker;
- a cam system including:
  - a cam coupled to the striker, the cam including a cam slot that extends orthogonal to the striker; and
  - a cam follower coupled to the actuator and positioned within the cam slot; and
- a controller,
- wherein the controller operates the actuator to move the cam follower within the cam slot to move the striker between and hold the striker at each of a first predetermined position in which the striker is configured to not couple to the latch of the door, a second predetermined position in which the striker is configured to be received by and couple to the latch of the door, and a third predetermined position between the first predetermined position and the second predetermined position in which the striker is configured to be coupled to the latch of the door.

11. The door system according to claim 10, further comprising:

a body structure that defines a door opening that is opened and closed by the door, the striker being coupled to the body structure;

the door that is movable relative to the body structure to open and close the door opening, the door including the latch; and a seal coupled to one of the door or the body structure, wherein the striker is pivotable relative to the body structure between the first predetermined position, the second predetermined position, and the third predetermined position, wherein when in the first predetermined position, the striker protrudes into the door opening less than in the second predetermined position and less than in the third predetermined position, wherein when in the second predetermined position, the striker is pivoted outward from the body structure relative to the first predetermined position and protrudes into the door opening to be received by and couple to the latch, and wherein when in the third predetermined position and coupled to the latch, the striker transfers a cinching force to the door to compress the seal between the body structure and the door, the cinching force being greater than force transferred by the striker between the body structure and the door when in the second predetermined position.

12. The door system according to claim 10, further comprising:

a body structure that defines a door opening, wherein the striker is pivotable relative to the body structure between the first predetermined position, the second predetermined position, and the third predetermined position, wherein the first predetermined position is a retracted position in which the striker protrudes into the door opening less than in the second predetermined position and less than in the third predetermined position.

13. The door system according to claim 10, further comprising:

a body structure and a seal, wherein when in the third predetermined position, the striker transfers a cinching force to the door to compress the seal between the body structure and the door, the cinching force being greater than force transferred by the striker between the body structure and the door when in the second predetermined position.

14. The door system according to claim 10, wherein the striker has a range of motion between the first predetermined position to the second predetermined position greater than 60 degrees.

15. The door system according to claim 14, wherein the striker is moved between 5 and 20 degrees from the second predetermined position to the third predetermined position.

16. The door system according to claim 10, wherein the actuator moves the cam rotationally.

17. The door system according to claim 10, wherein the cam slot is configured such that any movement of the cam follower results in movement of the cam.

* * * * *